Figure 1:
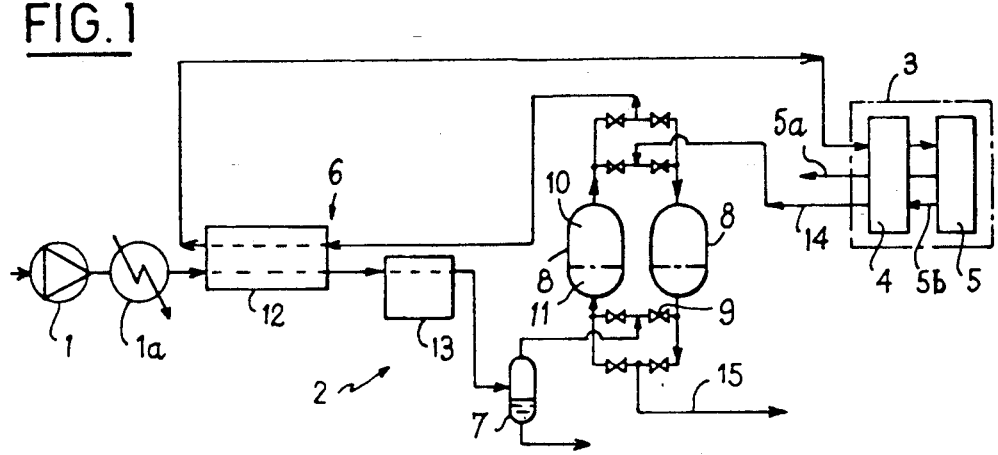

United States Patent [19]

Grenier et al.

[11] Patent Number: 5,137,548
[45] Date of Patent: Aug. 11, 1992

[54] PROCESS AND APPARATUS FOR PURIFYING AIR TO BE DISTILLED BY ADSORPTION

[75] Inventors: Maurice Grenier, Paris; Sophie Gastinne, Notre Dame de Gravenchon; Pierre Petit, Chatenay Malabry; François Venet, Paris, all of France

[73] Assignee: L'Air Liquide, Societe Anonyme pour l'Etude et l'Exploitation des Procedes Georges Claude, Paris, France

[21] Appl. No.: 695,927

[22] Filed: May 6, 1991

[30] Foreign Application Priority Data

May 9, 1990 [FR] France ................. 90 05779

[51] Int. Cl.⁵ ......................... B01D 53/04
[52] U.S. Cl. ................................. 55/23; 55/26; 55/28; 55/31; 55/33; 55/62; 55/74; 55/75
[58] Field of Search .......... 55/23, 25, 26, 31, 33, 55/62, 74, 75, 179, 267-269, 387, 389; 62/13, 17, 18, 31

[56] References Cited

U.S. PATENT DOCUMENTS

| | | | |
|---|---|---|---|
| 2,224,227 | 12/1940 | Keith, Jr. et al. | 55/33 X |
| 2,588,296 | 3/1952 | Russell, Jr. | 55/33 X |
| 2,968,160 | 1/1961 | Schilling et al. | 62/18 X |
| 3,140,931 | 7/1964 | McRobbie | 55/31 X |
| 3,210,950 | 10/1965 | Lady | 62/18 X |
| 3,594,984 | 7/1971 | Toyama et al. | 55/33 |
| 3,722,226 | 3/1973 | McDermott et al. | 62/18 X |
| 3,967,464 | 7/1976 | Cormier et al. | 62/18 X |
| 4,092,131 | 5/1978 | Rohde | 55/33 |
| 4,152,130 | 5/1979 | Theobald | 62/18 |
| 4,329,158 | 5/1982 | Sircar | 55/33 X |
| 4,372,764 | 2/1983 | Theobald | 62/18 X |
| 4,375,367 | 3/1983 | Prentice | 62/18 X |
| 4,380,457 | 4/1983 | Rathborne et al. | 55/33 |
| 4,557,735 | 12/1985 | Pike | 55/26 |
| 4,711,645 | 12/1987 | Kumar | 55/33 X |
| 4,746,343 | 5/1988 | Ishizu et al. | 62/18 X |
| 4,806,136 | 2/1989 | Kiersz et al. | 62/18 |
| 4,957,523 | 9/1990 | Zarate et al. | 62/18 X |

FOREIGN PATENT DOCUMENTS

| | | | |
|---|---|---|---|
| 44679 | 1/1982 | European Pat. Off. | |
| 53-037583 | 4/1978 | Japan | 55/25 |
| 53-037585 | 4/1978 | Japan | 55/25 |
| 54-152667 | 12/1979 | Japan | 55/31 |
| 1450164 | 9/1976 | United Kingdom | |
| 1586961 | 3/1981 | United Kingdom | |

Primary Examiner—Robert Spitzer
Attorney, Agent, or Firm—Curtis, Morris & Safford

[57] ABSTRACT

According to this process, compressed air is cooled and purified by adsorption by passing same in a first direction through a mass of adsorbent material (8), then a residual gas from the distillation apparatus passes in opposite direction through this mass to regenerate same. During the entire regeneration, the residual gas is at a constant regeneration temperature which is between the temperature of the air entering into the mass of adsorbent material and at a temperature which is about 50° C. above this temperature.

10 Claims, 2 Drawing Sheets

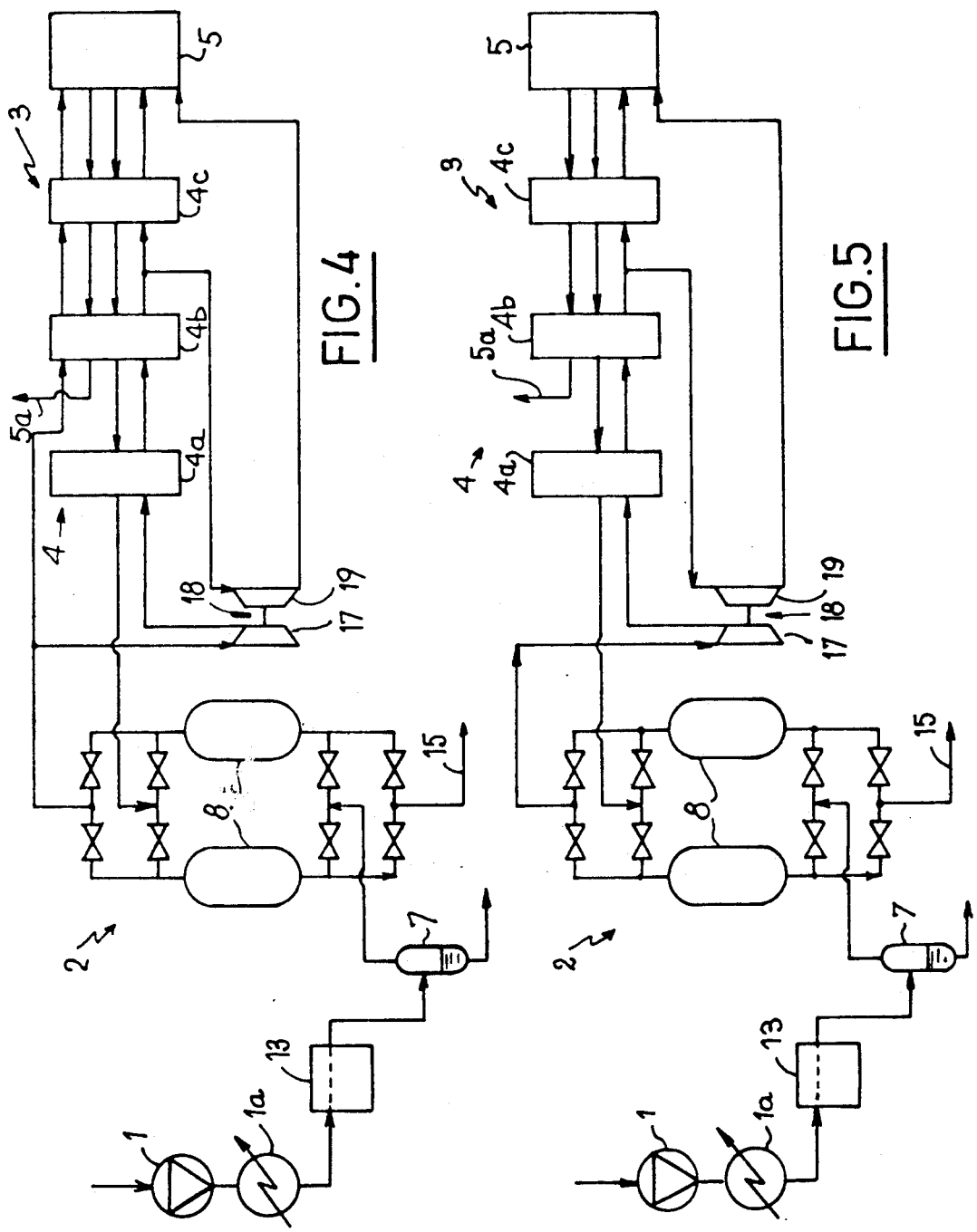

PROCESS AND APPARATUS FOR PURIFYING AIR TO BE DISTILLED BY ADSORPTION

The present invention relates to a process for drying and decarbonating atmospheric air by adsorption before the latter enters into the cold box of an apparatus for the distillation of air, of the type in which compressed air is cooled at an adsorption temperature and is purified by adsorption upon travelling in a first direction through a mass of adsorbent material, following which a residual gas from the distillation apparatus, at a regenerating temperature, passes through the mass of adsorbent material in opposite direction, to regenerate the same, after which the mass of adsorbent material is reused for the adsorption phase.

In the presently known apparatuses for air distillation, compressed atmospheric air is, before its entry into the cold box, dried and decarbonated (purified by water and $CO_2$ removal) by selective adsorption, upon passing through an appropriate mass of adsorbent material, for example a single bed of molecular sieve or a double bed (preferably a bed of alumina followed by a bed of molecular sieve).

For this purpose, two masses of adsorbent material are used in parallel, wherein one is active while the other is being regenerated in countercurrent, i.e. in a direction opposite to the circulation of air during the adsorption phase.

To carry out the regeneration, there is used a residual gas from the apparatus, which is available at a flow of the order of 15 to 70% of the flow of incoming air. This residual gas consists of impure nitrogen in the case of apparatuses for the production of oxygen, and some rich vaporized liquid (oxygen enriched air) for the apparatuses for the production of nitrogen.

According to the known technique, in a first step of regeneration, the residual gas is heated at a relatively high temperature, of the order of 100° to 350° C., and creates a heat front which completely passes through the mass of adsorbent material. Because the adsorbent material has highly reduced adsorption properties at this temperature, it is necessary to cool it before reusing it in the adsorption phase, in order to prevent the sending of a heat wave in the cold box.

This is the reason why the phase of regeneration must comprise a final step of cooling of the adsorbent material during which the non heated residual gas, which is consequently at about room temperature, circulates countercurrently through this adsorbent material.

This technique, which is very widely used at present, has serious disadvantages. In particular:

the use of the cooling step cannot be avoided, which complicates the apparatus and its operation, while this step has no utility in so far as the regeneration of the adsorbent material;

a mounted electrical power supply must be provided, which is only used for a certain period of time;

the high temperature regeneration causes heat losses in the vicinity of the walls of the adsorbers; then heat insulation is required to produce a uniform regeneration in the mass of adsorbent material, and also for the protection of the employees.

The invention aims at removing these disadvantages, in particular in the case of small apparatuses for the production of oxygen and/or nitrogen, possibly in gaseous form.

For this purpose, it is an object of the invention to provide a process of the type mentioned above, characterized in that during the entire regeneration, the residual gas used for the regeneration, is at a regeneration temperature substantially constant and moderate, higher than the temperature of the air penetrating into the mass of adsorbent material and in that the duration of an adsorption and regeneration cycle is at least equal to 30 minutes.

According to an aspect of the invention, the difference between the regeneration temperature and the adsorption temperature does not exceed 50° C., and is typically of the order of 10° to 20° C., the adsorption temperature being comprised between 5° and 20° C., typically about 10° C.

According to other characteristics:

the purified air is warmed up to a temperature which is slightly higher than the regeneration temperature before its entry into the cold box;

the warming up is carried out by heat exchange with the air which exits from the compressor of the apparatus, which air is possibly pre-cooled;

the warming up is carried out by pressure boosting, the energy of the pressure boost being possibly supplied by means of a refrigerating turbine provided with the apparatus;

after cooling, the compressed air from which the water content has been partially removed by said cooling, is warmed up, preferably partially, before its entry into the mass of adsorbent material;

the residual gas is reheated, preferably by heat exchange with the air which exits from the compressor, before entering into the mass of adsorbent material.

It is also an object of the present invention to provide an apparatus for drying and decarbonating by adsorption which is adapted for such a process.

According to a first embodiment, this apparatus comprises a heat exchanger providing heat exchange between the purified air and the air which exits from the compressor of the apparatus for air distillation, possibly after pre-cooling of said air.

According to a second embodiment, the apparatus according to the invention comprises an auxiliary heat exchanger providing heat exchange between the completely cooled air and the compressed air which is not yet completely cooled down.

Advantageously, the latter apparatus comprises in series, downstream of the compressor, a first heat exchanger, said auxiliary heat exchanger and a final heat exchanger, and the first heat exchanger providing heat exchange between the air which exits from the compressor and the residual gas which exits from the cold box of the air distillation apparatus.

According to a third embodiment, the apparatus according to the invention comprises a pressure booster of at least a portion of the purified air, possibly operated by a refrigerating turbine provided with the apparatus.

Embodiments of the invention will now be described with reference to the annexed drawings, in which FIGS. 1 to 5 are schematic representation of five air distillation apparatuses including drying and decarbonation devices according to the invention.

Each figure shows an air distillation apparatus comprising an air compressor 1 provided at its outlet with its final refrigerating element 1a (refrigerating element consisting of water or an aerorefrigerating element), a drying and decarbonating device 2, and a cold box 3 comprising a heat exchange line 4 and a distillation column 5. The latter provides a production gas (gaseous oxygen and/or gaseous nitrogen) via a duct 5a and a regeneration gas, consisting of the residual gas of the apparatus, namely impure nitrogen or oxygen enriched air, via duct 5b.

In each of the illustrated examples, the device 2 comprises means 6 for cooling compressed air, typically between 5 and $25 \times 10^5$ Pa, a phase separator 7 adapted for removing condensation water from completely cooled air, and two adsorption bottles 8 mounted in parallel, with a set of appropriate valves 9. Each bottle 8 contains a bed 10 of molecular sieve of type 5A or 13X, possibly preceded (opposite the adsorption) by a bed of alumina 11.

In FIG. 1, the cooling means 6 comprise two heat exchangers 12 and 13 mounted in series. The atmospheric air is compressed by means of compressor 1 to a pressure of the order of 5 to $25 \times 10^5$ Pa absolute, generally 5 to $12 \times 10^5$ Pa, and exits from this compressor, after refrigeration at 1a, at a temperature of the order of 45° C. This air is pre-cooled in exchanger 12, then cooled at the adsorption temperature TA, between +5° and +20° C., typically about 10° C., in exchanger 13, which is refrigerated for example by means of a refrigerating unit.

Condensed water is removed in separator 7 and the air is introduced at the bottom of bottle 8 which is in adsorption phase (the one shown on the left of FIG. 1). After purification, the air, whose temperature has raised by a few °C. as a result of the heat of adsorption of the impurities, essentially water, passes through exchanger 12 in countercurrent, and is warmed therein up to about 40° C. This warmed air is the one which introduced into the heat exchange line 4 of the cold box of the apparatus.

When the adsorption front is near the outlet of the bottle 8, this bottle goes into regeneration phase by operating valves 9.

The regeneration phase comprises a single step during which the residual gas from the distillation apparatus, warmed against the stream of air in exchange line 4, exits from the latter at about 35° C., via duct 14, and is introduced in countercurrent flow, at this temperature, in bottle 8, after which it is removed via duct 15.

When regeneration is completed, bottle 8 is again placed in adsorption phase, possibly after a phase where the bottle is again up under pressure. The duration of a cycle of adsorption and regeneration is at least 30 minutes, in practice between 1 and 4 hours.

If the flow of regeneration gas is sufficient, a lower regeneration temperature may be suitable, for example 25° to 30° C., which is more advantageous. In this case, the exchanger 1a is dimensioned so as to bring the compressed air at a temperature which exceeds regeneration temperature by a few °C., for example 30° to 35° C., before its introduction into the exchanger 12.

It was thus possible to treat in the two following manners, 150 Nm³/h of air at $9 \times 10^5$ Pa absolute, saturated with water and containing about 400 vpm (parts per million in vapor phase) of $CO_2$:

| TA | Dg/Da | TR | t |
|-----|-------|-------|-----|
| 15° C. | 60% | 35° C. | 1 h |
| 8° C. | 30% | 35° C. | 2 h | where TA means the adsorption temperature, Dg/Da the ratio of the flow of regeneration gas to the flow of air, TR the temperature of regeneration and t the duration of each adsorption and regeneration phases.

Figure 2:
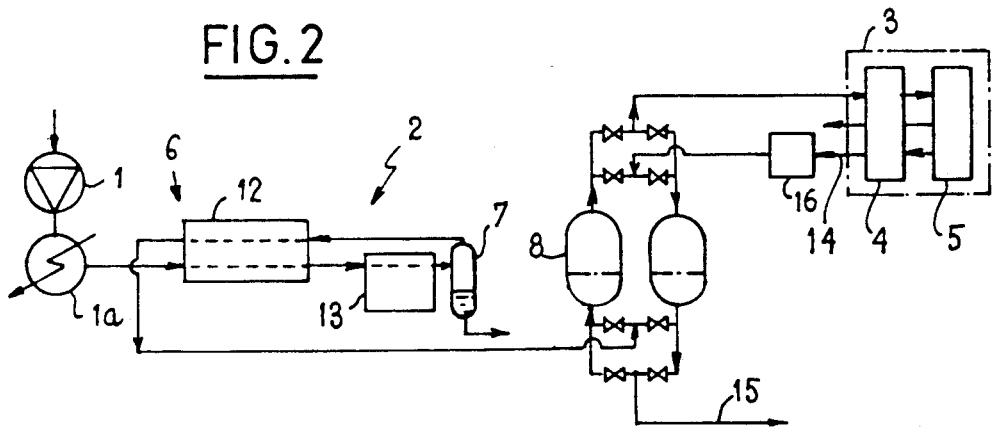

The same elements 1 to 15 are found in the schematic illustration of FIG. 2, with however a different arrangement with respect to the purifying device 2.

As a matter of fact, the air which exits from compressor 1, and which is pre-cooled at about 30° C. in exchanger 1a, is cooled at an intermediate temperature of about 15° C. in exchanger 12, then cooled to 5° to 10° C. in the exchanger 13.

After removing the condensation water from separator 7, the air is warmed up at about 25° C. in exchanger 12, after which it is sent into bottle 8 for the adsorption phase.

Thus, the adsorption is carried out at about 25° C., but with air which is not saturated with water, and having a dew point of 5° to 10° C. The adsorption heat is therefore not higher than what it was in the case of FIG. 1, and the purified air is introduced into the exchange line 4 at about 30° C. Then, the regeneration gas exits from the latter at about 25° C., and the regeneration of the adsorbent material is carried out at a temperature of 35° C., by means of a warming device 16 provided along duct 14.

Figure 3:
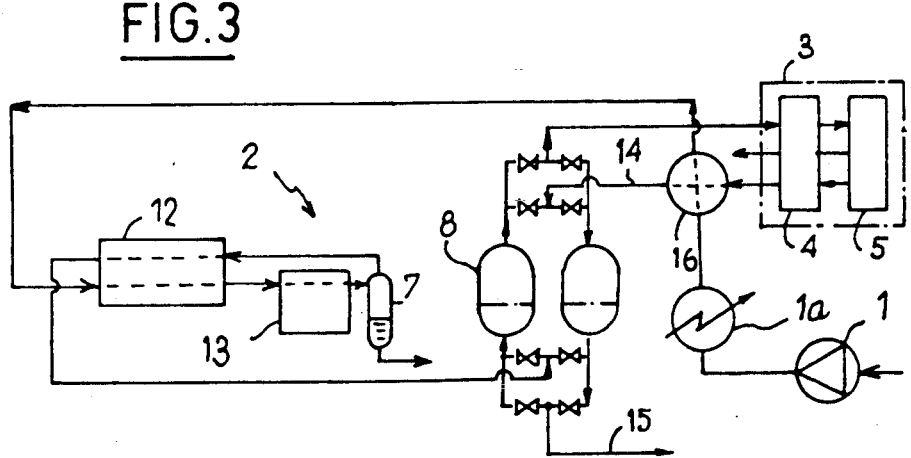

This warming up of the regeneration gas can be obtained by placing the duct 14 in heat exchange relationship with the compressed air which exits from the refrigerating element 1a, as represented in FIG. 3, which, apart from this difference, is identical to FIG. 2.

With the schematic illustration of FIG. 3, it was possible to treat 130 Nm³/h of compressed air at $9 \times 10^5$ Pa absolute, intended for an apparatus for the production of gaseous nitrogen supplying 80 Nm³/h of residual gas (rich vaporized liquid), under the following conditions:

adsorption phase: dew point of the air +5° C., $CO_2$ content about 400 vpm; adsorption temperature TA: 15° C.;

regeneration phase: regeneration temperature TR: 30° to 35° C.;

duration of each adsorption and regeneration phase: 1 H 30 mn.

FIGS. 4 and 5 illustrate another way to bring the regeneration gas at the desired regeneration temperature TR.

In FIG. 4, the air compressed at 1, pre-cooled at 1a, cooled at adsorption temperature at 13 and from which liquid water which is condensed at 7 is removed, is purified by adsorption at 8. A portion of the purified air is brought under high compression by means of a compressor 17 from a moto-compressor unit 18, then passes through exchange line 4, which includes three sections, hot 4a, intermediate 4b and cold 4c. The remainder of the purified air passes only through sections 4b and 4c. Between sections 4b and 4c, a fraction of the air which has been compressed at 17 is sampled and expanded in turbine 19 of the group 18 after which it is sent into column 5.

In this example, the turbine 19, which is used for the refrigeration of the apparatus, rotates the compressor 17, and the latter warms the appropriate fraction of air to a temperature which is slightly above regeneration temperature. Thus, the residual gas from column 5 is warmed at regeneration temperature at the hot end of the exchange line.

As indicated in FIG. 4, the production duct 5a may extend through sections 4c and 4b only, and thus exit from the exchange line at about room temperature.

By way of numerical example, it is possible to have:

adsorption pressure: $6 \times 10^5$ Pa absolute;
adsorption temperature TA: $+15°$ C.;
temperature of purified air: $+20°$ C.;
temperature of air under high compression: $+35°$ C.;
pressure of air under high compression: $5 \times 10^5$ Pa;
pressure of expended air: $1 \times 10^5$ Pa;
regeneration temperature TR: $+30°$ C.;
duration of the cycle: about 1 hour.

FIG. 5 corresponds to the limit case where the totality of the purified air is brought to high compression at 17. In all other respects, it is identical to FIG. 4.

We claim:

1. A method of drying and decarbonating air supplied to a cold box of an air distillation apparatus producing a product gas and a residual gas, comprising the steps of compressing the air, cooling the compressed air to a first positive temperature (°C.), passing the cooled compressed air in a first direction through at least one mass of adsorbent material for purifying said cooled compressed air, supplying the purified air to the cold box of the air distillation apparatus and cyclically passing the residual gas produced by the air distillation apparatus at a second temperature in opposite direction through said at least one mass of adsorbent material, the second temperature being between 10° and 50° C. higher than the first temperature and wherein the passing of cooled compressed air in said first direction and passing the residual gas in opposite direction comprise a cycle of adsorption and regeneration, and the duration of said cycle of adsorption and regeneration is not less than 30 minutes.

2. The method of claim 1, wherein the duration of a cycle of adsorption and regeneration is less than 3 hours.

3. The method of claim 1, wherein the first temperature is between 5° and 25° C.

4. The method of claim 1, further comprising the step of warming the purified air to a third temperature slightly higher than the first temperature.

5. The method of claim 4, wherein the warming of the purified air is carried out by heat exchange with the compressed air.

6. The method of claim 4, wherein the warming of the purified air is carried out by compression.

7. The method of claim 1, further comprising the step of warming the residual gas before passing the residual gas through the at least one mass of adsorbent.

8. The method of claim 7, wherein the difference between the second and first temperatures is between 10° and 20° C.

9. The method of claim 8, wherein the duration of a cycle of adsorption and regeneration is between 1 hour and 2 hours.

10. The method of claim 1, wherein the warming of the residual gas is carried out by heat exchange with the compressed air.

* * * * *